Dec. 10, 1963  A. PAGNACCO  3,113,453
APPARATUS FOR DETERMINING AND EVALUATING A CURVE INDICATING
THE FREQUENCY OF TEST VALVES IN A SERIES OF TESTS
Filed March 14, 1960  2 Sheets-Sheet 1

INVENTOR.
Arrigo Pagnacco
BY
Michael S. Striker
Attorney

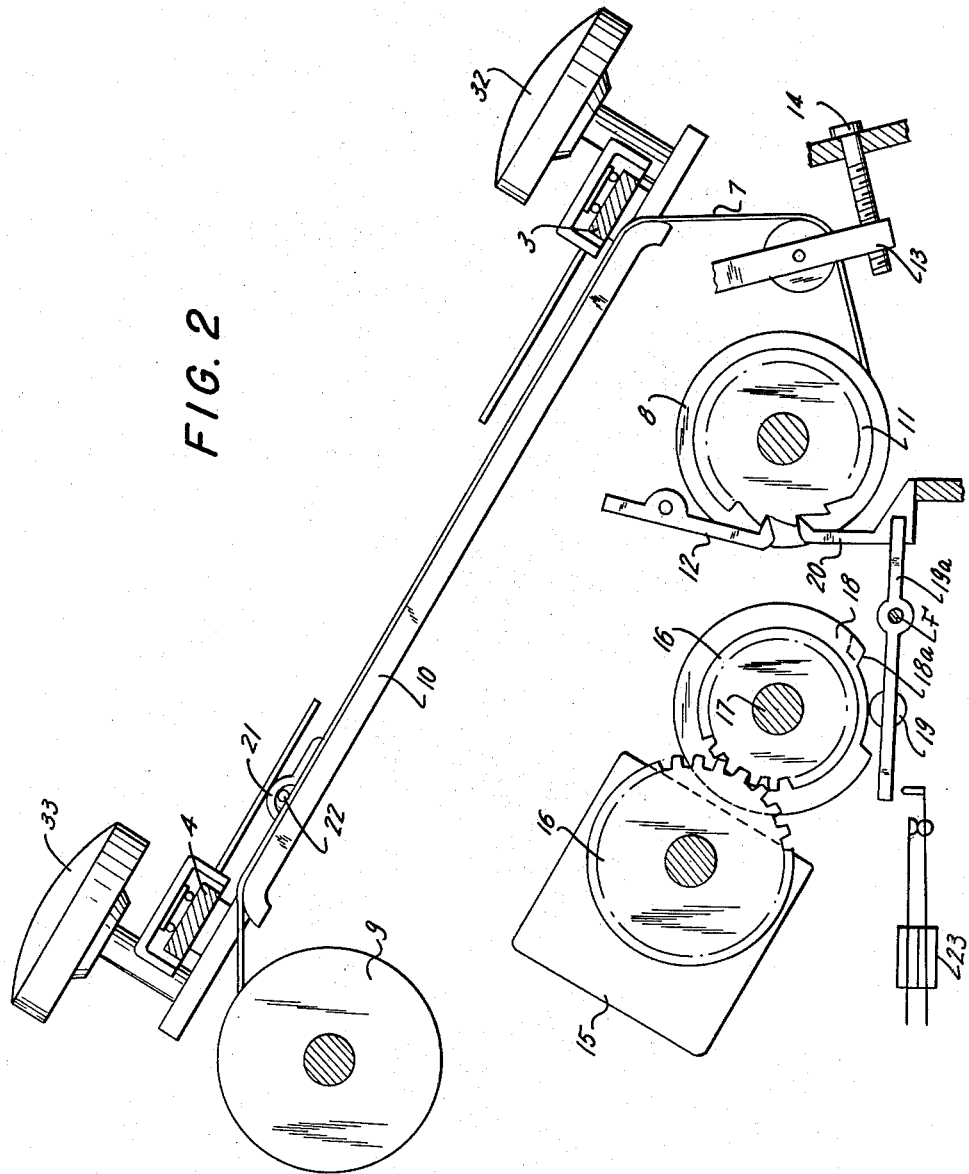

United States Patent Office 3,113,453
Patented Dec. 10, 1963

3,113,453
APPARATUS FOR DETERMINING AND EVALUATING A CURVE INDICATING THE FREQUENCY OF TEST VALUES IN A SERIES OF TESTS
Arrigo Pagnacco, 10 Via Ariosto, Milan, Italy
Filed Mar. 14, 1960, Ser. No. 14,966
Claims priority, application Italy Nov. 6, 1959
12 Claims. (Cl. 73—95)

Dynamometers are known from which it is possible to obtain a gaussian curve for $n$ breaking strengths, from which a coefficient of variation which is only approximate can be deduced.

An abacus is also known of under the name of "Statifix" which, having established the values of the frequencies of the classes in percentages, taken from $n$ breaking strength tests, makes it possible to find, by means of a rule, the value of displacement to enter in the formula:

$$\text{Coefficient of Variation} = \frac{\text{displacement}}{\text{average breaking strength}} \times 100$$

which must then be calculated.

It is an object of the invention to provide an electromechanical equipment which makes it possible to automatically determine the coefficient of variation of any value, whatever, and in particular, of the value of breaking strength of threads made from natural or synthetic fibers.

It is possible, with said equipment, to construct a progressive curve of the frequencies of the classes or test results and, from this curve, without calculations, but using a galvanometric bridge circuit, to read the coefficient of variation of the breaking strength of the material being tested directly from a dial.

This coefficient of variation of a thread is very important and is used to express its irregularity in percentage, that is, the extent to which the thread being tested deviates from perfection.

In this latter case, that is in the case of a perfect thread, the coefficient of variation would be zero.

Figure 1:
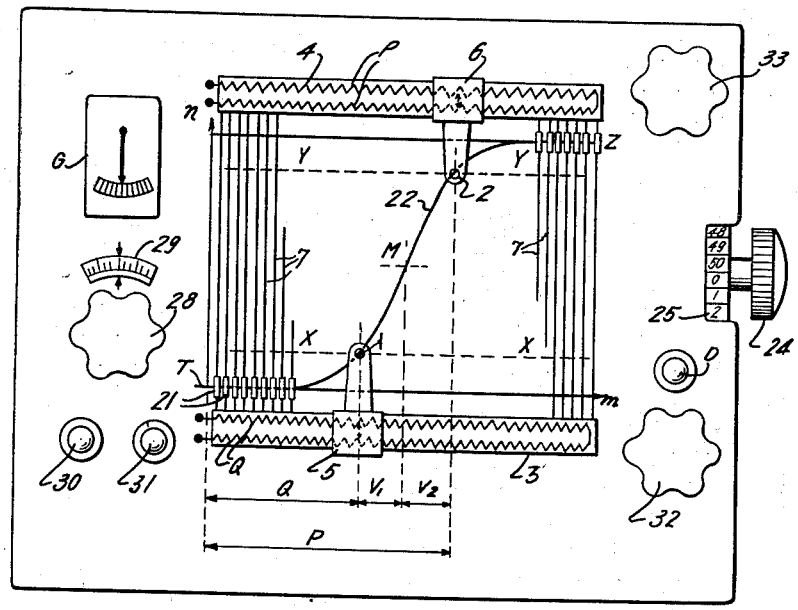
Figure 3:
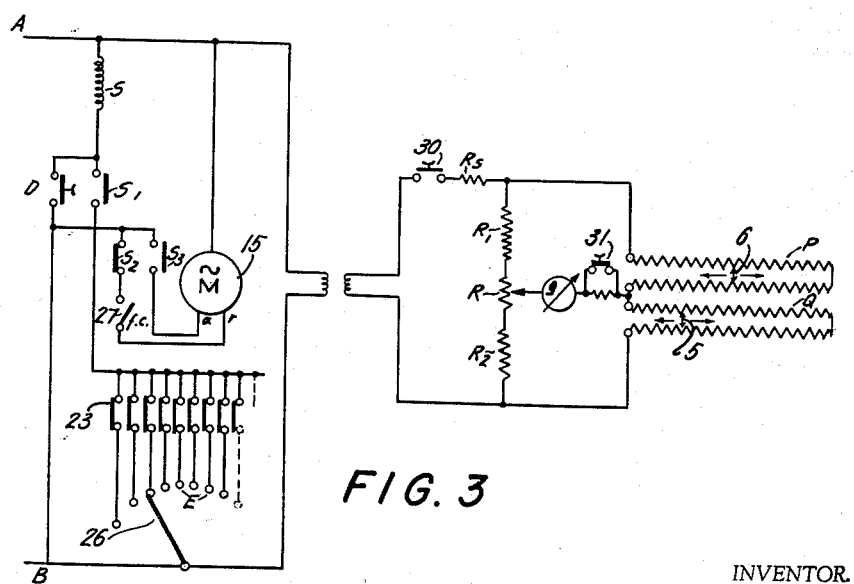

The equipment, according to the invention, is represented, for the purpose of giving an example, in the attached drawings, in which:

FIG. 1 is a general front view.
FIG. 2 shows a large scale diagram of one of the series of mechanisms.
FIG. 3 is a diagram of the electric circuit.

As shown in the drawings, the equipment, according to the invention, comprises a series of mechanisms (FIGS. 1 and 2) and an electric circuit (FIG. 3).

FIG. 1 shows a general view, having as abscissa a number $m$ of classes or test values and as ordinate a number $n$ of tests.

The horizontal lines X—X and Y—Y determine the limits of the interval comprising 68% of the tests, while above line Y—Y and below line X—X two other intervals, each comprising 16% of the tests remain, since the total of said tests, that is, 100% is comprised between the horizontal lines T and Z.

The progressive curve of the frequencies of the classes can be seen in the figure; it intersects the lines X—X and Y—Y in two points, 1 and 2, which, in respect to point M, which corresponds to the average of all the $n$ tests, determines the two quantities $V_1$ and $V_2$, known as the lower and upper standard variations, respectively, each representing the displacement which appears in the above given formula.

Wires, having a precise electrical resistance are fixed to the guides 3 and 4, on which contacts carried by sliders 5 and 6 are free to slide.

Having aligned the sliders 5 and 6 with the points 1 and 2 on the curve by turning knobs 32 and 33, the portions P and Q of the electrical resistance of the wires are determined.

The coefficient of variation, given in percentage from the formula:

$$V = \frac{\text{standard variation}}{\text{average breaking strength}} \times 100 = \frac{V_1}{Q+V_1} \times 100$$

or better:

$$\frac{\text{Lower standard var.} + \text{upper std. var.}}{2 \times \text{average breaking strength}} \times 100$$

$$= \frac{V_1 + V_2}{2(Q+V_1)} \times 100$$

in which $V_1 + V_2 = P - Q$ while $2(Q+V_1) = P+Q$ (approx.)

As a result, $$V = \frac{P-Q}{P+Q} \times 100$$

a ratio which is obtained electrically in the equipment according to the invention, by a galvanometric bridge circuit (FIG. 3).

The approximation introduced into the denominator $P+Q$ is maximum if the two standard variations $V_1$ and $V_2$ are equal, as in general occurs if the thread is regular.

If they are different, the error which is introduced is, however, always very small and negligible.

FIG. 2 shows a detail of one of a series of $m$ mechanisms corresponding to the number of the $m$ classes which are placed in the equipment one alongside the other.

A band of metal or of other flexible material 7 is stretched between the supply spool 9 and a take-up spool 8 and rests against the surface 10.

A sawtooth gear or ratchet wheel 11 is fixed to take-up spool 8, the gear being prevented from rotating backwards by pawl 12.

The band 7 is held taut by a coil spring (not shown) contained in the spool 9 and by means of a tension device 13, adjustable by screw 14.

All the mechanisms $m$ are driven by a common motor 15 and a set of gears 16 driving the shaft 17 on which are mounted the cams 18.

Turning shaft 17 causes the cams 18, displaced one from another by a certain angle, to lower their respective rollers 19 one after another, while the pawl 20 causes the sawtooth gear 11 of pulley 8 to move another notch, and therefore, also the band 7.

A small plate 21 having a hole is fixed to each band 7.
A thread of nylon or other material 22 passes through all said holes.

In the beginning the small plates are all lined up one next to the other and the thread 22 is situated horizontally above along the line Z of the panel (FIG. 1).

When the equipment operates in the manner described below, the cams 18 cause the small plate 21 to move ahead a step starting with the plate 21 at the extreme left end of the series of plates as viewed in FIG. 1 and continuing with the following plates toward the right until the plate corresponding to the class or test value for which the apparatus has been set, has been moved.

At the end of $n$ tests, the thread 22 will be arranged in the form of a curve as can be seen from FIG. 1, connecting the classes at the left which have made all the $n$ steps with those on the right which have not made any steps.

Said curve, formed by the thread 22 represents the progressive curve of the frequency of classes.

To return the thread 22 to its upper position, a control is operated (not shown) which frees pawl 12 from the sawtooth gear 11, allowing the bands 7 to return to their original position.

The electrical circuit (FIG. 3) is composed of two parts: to the left is the part which is used to operate the mechanisms in FIG. 2; to the right is the part making up the bridge circuit which is used to determine the coefficient of variation V.

In the drawing, A and B are the two wires which conduct the single-phase, 23 are the switches, one for each class; S is a relay, which carries contacts $S_1$, $S_2$, $S_3$ (in the figure they are shown in the non-energized position, no current flowing); D is a pushbutton which is used to energize relay S.

The contacts E connected to switches 23 are distributed on a fixed disc (not shown) which is coaxial to the knob 24 (FIG. 1).

This knob is connected to a disc 25 which carries on its outer edge numbers from 0 to 50 (if 50 is the number of classes in the equipment) and carries a contact 26 (FIG. 3); by rotating knob 24, said contact or selector switch 26 slides succesively along contacts E, and the contact E on which the contact 26 stops corresponds to the class shown on the numbered disc 25.

The equipment functions as follows: after adjusting knob 24 to show the desired class, for example, class 32, pushbutton D is pressed, which energizes relay S; S closes contact $S_1$ which keeps S energized through the contact of class 32, opens contact $S_2$ and closes contact $S_3$ and thereby starts up motor 15.

The cams 18 open contacts 23 one after another; when the contact corresponding to class 32 opens, the current to relay S is cut off, opening contacts $S_1$ and $S_3$ and closing contact $S_2$; the motor 15 reverses its direction of rotation and returns in the opposite direction until the limit switch 27 stops it.

The second part of the electrical circuit (FIG. 3, right) comprises a standard bridge circuit, in which the two resistors, P and Q are inserted, depending on the position of the two sliders 5 and 6 (FIG. 1).

From FIG. 3 can be seen that for each position of P and Q, the resistance R must be adjusted so as to bring the indicator of the galvanometer G to zero.

By attaching a circular dial to knob 28, attached to resistance R (a section of said dial being shown in FIG. 1), and calibrating it, according to the formula $$\frac{-P-Q}{P+Q} \times 100$$

the percentage value of the coefficient of variation V can be read directly from it in percentage.

By pressing pushbutton 30, current is allowed to flow in the bridge circuit, while pressing pushbutton 31 adjustment is made for zeroing the galvanometer.

Supposing, now, that we have a series $n$ of values subdivided in classes, and from which it is desired to obtain the coefficient of variation V, for each of the classes, the following operation is made:

Knob 24 is brought to read the class of that particular value and pushbutton D is pressed; with the motor 15 started up and the motor gears rotating 16, which actuate cams 18, all the bands 7, up to and including the one corresponding to the class previously selected with knob 24, advance one step.

Then shaft 17 of cams 18 rotates in the opposite direction and return is made to the original position.

As soon as motor 15 stops, knob 24 is once again set for the next value and so on in succession for all of the $n$ values.

A curve will be obtained like the one shown in FIG. 1 and the sliders 5 and 6 are shifted until the points 1 and 2 thereof are aligned with the intersection points of the lines X—X and Y—Y with the curve; pushbutton 30 is then pressed and the first adjustment is made to resistance R by means of knob 28 to bring the galvanometer to zero; adjustment is completed with pushbutton 31, and the value of the coefficient of variation is read on the dial in percentage.

The equipment so described may be coupled to an autodynamograph, which is an automatic dynamometer for threads.

This latter registers, among other values, the breaking strength of 70 consecutive tests; the registration of said strengths is obtained by means of a motor identical to motor 15 mentioned above.

Coaxially to it is fixed a disc analogous to the one carrying contacts E, and a sliding contact, analogous to the rotating contact 26.

The autodynamograph, with its automatic mechanism, drives its motor; motor 15, which operates in synchronism with it, follows it in its rotation by means of a system of relays, making an equal number of revolutions.

No manual intervention is required, at the end of the 70 tests, the progressive curve of the frequency of classes, as previously described, will take form on the panel of the equipment according to the invention.

The operation with knob 28 will then be repeated to zero the index of the galvanometer and on dial 29 the percentage of the coeffiicent of variation V can then be read.

Having thus described the invention, what is claimed as new and desired to be secured by Letters Patent is:

1. An apparatus for determining a curve indicating the frequency of test values in a series of tests comprising, in combination, a plurality of successively arranged indicating means respectively movable along substantially parallel paths from starting positions aligned along a line transverse to said paths; a plurality of moving means each operatively connected to one of said indicating means for moving the same upon each actuation thereof from the starting position thereof one step along the corresponding path; drive means operatively connected to said plurality of moving means and adapted when actuated to drive a selected combination of moving means and to move thereby the indicating means respectively connected thereto one step along the corresponding path of the latter; and selector means between said drive means and said plurality of moving means movable into a plurality of selecting positions in each of which it causes said drive means to drive a different combination of said plurality of moving means.

2. An apparatus for determining a curve indicating the frequency of test values in a series of tests comprising, in combination, a plurality of successively arranged indicating means respectively movable along substantially parallel paths from starting positions aligned along a line transverse to said paths; a plurality of moving means each operatively connected to one of said indicating means for moving the same upon each actuation thereof from the starting position thereof one step along the corresponding path; drive means operatively connected to said plurality of moving means and adapted when actuated to drive a selected combination of moving means and to move thereby the indicating means respectively connected thereto one step along the corresponding path of the latter; and selector means between said drive means and said plurality of moving means movable into a plurality of selecting positions in each of which it causes said drive means to drive a different combination of said plurality of moving means, said combinations different from each other in the number of moving means driven by said drive means.

3. An apparatus for determining a curve indicating the frequency of test values in a series of tests comprising, in combination, a plurality of successively arranged indicating means respectively movable along substantially parallel paths from starting positions aligned along a line transverse to said paths; a plurality of moving means each operatively connected to one of said indicating means for moving the same upon each actuation thereof from the starting position thereof one step along the corresponding path; drive means operatively connected to said plurality of moving means and adapted when actuated to drive a selected combination of moving means and to move thereby the indicating means respectively connected thereto one step along the corresponding path of the latter; and selector means between said drive means and said plurality of moving means movable into a plurality of selecting positions in each of which it causes said drive means to drive a different combination of said plurality of moving means, each of the different combinations including one moving means connected to one of the successively arranged indicating means and all moving means connected to indicating means preceding said one indicating means.

4. An apparatus for determining a curve indicating the frequency of test values in a series of tests comprising, in combination, a plurality of indicating means equal in number to a series of preselected test values consecutively increasing in preselected steps, said indicating means being successively arranged respectively movable along substantially parallel paths from starting positions aligned along a line substantially normal to said paths; a plurality of successively arranged moving means each operatively connected to and each aligned with one of said indicating means for moving the same upon each actuation thereof from the starting position thereof one step along the corresponding path; drive means operatively connected to said plurality of moving means and adapted when actuated to drive a selected combination of moving means and to move thereby the indicating means respectively connected thereto one step along the corresponding path of the latter; and selector means between said drive means and said plurality of moving means movable into a plurality of selecting positions each corresponding to one of said test values and in each of which it causes said drive means to drive a different combination of said plurality of moving means, each of said combinations including one of said consecutively arranged moving means and all moving means preceding said one moving means so that when said selector means is moved into a selecting position corresponding to one of said test values, the indicating means corresponding to said one test value and all indicating means preceding said one test value are moved along their respective paths when said drive means is actuated, whereby after said selector means has been successively moved into a plurality of selecting positions corresponding to all test values of a series of tests, said indicating means will be arranged along a curve showing the frequency of test values in the series of tests.

5. An apparatus as defined in claim 4 and including a pair of contact guides arranged spaced from and substantially parallel to each other and substantially normal to said paths; a pair of variable resistors respectively coordinated with said guides; a contact arranged on each guide movable from a starting position aligned with the path of the first of said indicating means toward the path of the last of said indicating means, said contacts being respectively connected to said variable resistors for adjusting the resistance thereof depending on the position of the respective contacts on its contact guide; electric bridge means connected in circuit with the adjusted resistances of said variable resistors and including zeroing means for zeroing said bridge means; and a dial operatively connected to said zeroing means, said dial calibrated to indicate when said contacts are respectively aligned with indicating means corresponding to the upper and lower standard variations of the test values a value substantially equal to $$\frac{\text{standard variation}}{\text{average test value}} \cdot 100$$

6. An apparatus for determining a curve indicating the frequency of test values in a series of tests comprising, in combination, a plurality of indicating means equal in number to a series of preselected test values consecutively increasing in preselected steps, said indicating means being successively arranged respectively movable along substantially parallel paths from starting positions aligned along a line substantially normal to said paths, said plurality of indicating means including a plurality of consecutive portions of an elongated flexible member respectively extending transversely to said parallel paths; a plurality of successively arranged moving means each operatively connected to and each aligned with one of said indicating means for moving the same upon each actuation thereof from the starting position thereof one step along the corresponding path; drive means operatively connected to said plurality of moving means and adapted when actuated to drive a selected combination of moving means and to move thereby the indicating means respectively connected thereto one step along the corresponding path of the latter; and selector means between said drive means and said plurality of moving means movable into a plurality of selecting positions each corresponding to one of said test values and in each of which it causes said drive means to drive a different combination of said plurality of moving means, each of said combinations including one of said consecutively arranged moving means and all moving means preceding said one moving means so that when said selector means is moved into a selecting position corresponding to one of said test values, the indicating means corresponding to said one test value and all indicating means preceding said one test value are moved along their respective paths when said drive means is actuated, whereby after said selector means has been successively moved into a plurality of selecting positions corresponding to all test values of a series of tests, said indicating means will be arranged along a curve showing the frequency of test values in the series of tests.

7. An apparatus for determining a curve indicating the frequency of test values in a seres of tests comprising, in combination, a plurality of indicating means equal in number to a series of preselected test values consecutively increasing in preselected steps, said indicating means being successively arranged respectively movable along substantially parallel paths from starting positions aligned along a line substantially normal to said paths, said plurality of indicating means including a plurality of consecutive portions of an elongated flexible member respectively extending transversely to said parallel paths; a plurality of successively arranged moving means each operatively connected to and each aligned with one of said indicating means for moving the same upon each actuation thereof from the starting position thereof one step along the corresponding path, said plurality of moving means including a plurality of elongated elements respectively extending along said parallel paths and respectively fixedly connected to said consecutive portions of said elongated flexible member; drive means operatively connected to said plurality of moving means and adapted when actuated to drive a selected combination of moving means and to move thereby the indicating means respectively connected thereto one step along the corresponding path of the latter; and selector means between said drive means and said plurality of moving means movable into a plurality of selecting positions each corresponding to one of said test values and in each of which it causes said drive means to drive a different combination of said plurality of moving means, each of said combinations including one of said consecutively arranged moving means and all moving means preceding said one moving means so that when said selector means is moved into a selecting position corresponding to one of said test values, the indicating means corresponding to said one test value and all indictaing means preceding said one test value are moved along their respective paths when said drive means is actuated, whereby after said selector means has been successively moved into a plurality of selecting positions corresponding to all test values of a series of tests, said indicating means will be arranged along a curve showing the frequency of test values in the series of tests.

8. An apparatus as set forth in claim 7 in which each of said moving means includes ratchet means operatively connected to the respective elongated element; and pawl means cooperating with said ratchet means for stepwise moving the same.

9. An apparatus as set forth in claim 8 in which said drive means include motor means and means cooperating with said motor means and said pawl means for successively operating the pawl means of the respective combination of moving means.

10. An apparatus as set forth in claim 9 in which said selector means include switch means cooperating with said pawl means for stopping said motor means after the last of the successively operated pawl means of the respective combination of moving means has been operated.

11. An apparatus as set forth in claim 9 in which said motor means is an electric motor adapted to be connected and disconnected from a current supply and in which said selector means include a plurality of normally closed switches connected in series with said electric motor, one switch for each of said pawl means and each cooperating with the respective pawl means to be moved from the closed to open position upon operation of the respective pawl means; and a selector switch to be selectively placed in series with one of said plurality of switches so that said electric motor is stopped when the one normally closed switch to which said selector switch is connected is opened by the pawl means coopertaing with said one switch.

12. In an apparatus including elongated flexible indicating means adapted to be flexed into a curve showing the frequency of test values in a series of tests in which the abscissas of the curve are indicative of the test values and the ordinates of the curve indicative of the number of tests, in combination, a pair of elongated guides extending parallel to each other and to said abscissas; a pair of variable resistors; a pair of slide means respectively movable along said elongated guides from a starting position on one end of said curve toward the other end thereof and respectively operatively connected to said variable resistors for adjusting the resistance thereof depending on the position of the respective slide means on its guide; electric bridge means connected in circuit with the adjusted resistances of said variable resistors and including zeroing means for zeroing said bridge means; and a dial operatively connected to said zeroing means, said dial calibrated to indicate, when said slide means are respectively aligned with portions of said curve corresponding to the upper and lower standard variations of the test values, a value substantially equal to $$\frac{\text{standard variation}}{\text{average test value}} \cdot 100$$

References Cited in the file of this patent

UNITED STATES PATENTS

| | | |
|---|---|---|
| 2,329,679 | Scott | Sept. 14, 1943 |
| 2,355,812 | Martindell | Aug. 15, 1944 |
| 2,677,310 | Campbell | May 4, 1954 |

FOREIGN PATENTS

| | | |
|---|---|---|
| 681,477 | Great Britain | Oct. 22, 1952 |
| 772,049 | Great Britain | Apr. 10, 1957 |